United States Patent
Muratore et al.

(10) Patent No.: US 9,028,577 B2
(45) Date of Patent: *May 12, 2015

(54) NETWORK ADAPTED TO MANAGE DIFFERENT MOBILE TELEPHONY SERVICES

(71) Applicant: Telecom Italia S.p.A., Milan (IT)

(72) Inventors: Guiliano Muratore, Rome (IT); Pier Camillo Pelliccia, Rome (IT)

(73) Assignee: Telecom Italia S.p.A., Milan (IT)

(*) Notice: Subject to any disclaimer, the term of this patent is extended or adjusted under 35 U.S.C. 154(b) by 0 days.

This patent is subject to a terminal disclaimer.

(21) Appl. No.: 13/626,368

(22) Filed: Sep. 25, 2012

(65) Prior Publication Data

US 2013/0165076 A1   Jun. 27, 2013

Related U.S. Application Data

(62) Division of application No. 11/630,883, filed on Dec. 27, 2006, now Pat. No. 8,290,487.

(30) Foreign Application Priority Data

Jun. 29, 2004   (WO) ................. PCT/EP2004/007041

(51) Int. Cl.
*H04M 3/42*   (2006.01)
*H04W 4/06*   (2009.01)
*H04W 8/04*   (2009.01)
*H04W 88/00*  (2009.01)
*H04W 8/12*   (2009.01)

(52) U.S. Cl.
CPC .... *H04W 4/06* (2013.01); *H04W 8/04* (2013.01); *H04W 8/12* (2013.01); *H04W 88/00* (2013.01)

(58) Field of Classification Search
USPC ............ 455/433, 432.1, 411, 448, 552.1, 466
See application file for complete search history.

(56) References Cited

U.S. PATENT DOCUMENTS 6,157,832 A * 12/2000 Lahtinen .................. 455/433
6,577,723 B1   6/2003 Mooney
6,738,622 B1   5/2004 Stadelmann et al.

(Continued)

FOREIGN PATENT DOCUMENTS

| | | |
|---|---|---|
| EP | 1 223 781 A2 | 7/2002 |
| EP | 1 250 016 A1 | 10/2002 |
| WO | WO 98/02008 | 1/1998 |
| WO | WO 00/56085 | 9/2000 |

OTHER PUBLICATIONS

Ericcson, Shared Networks for WCDMA, Aug. 2003.
International Search Report, PCT/EP2004/007041, Feb. 22, 2005.
European Patent Office Communication dated Nov. 16, 2011 re Appln. No. 04 740 430.6-1525.

*Primary Examiner* — Kiet Doan
*Assistant Examiner* — Dung Lam
(74) *Attorney, Agent, or Firm* — Finnegan, Henderson, Farabow, Garrett & Dunner, L.L.P.

(57) ABSTRACT

A mobile network is adapted to provide a first mobile telephony service to a first group of subscribers and a second mobile telephony service to a second group of subscribers. The mobile network includes a home location register; at least one switching equipment cooperating with the home location register for providing the first mobile telephony service to the first group of subscribers; at least one adapter node cooperating with the home location register and with the switching equipment for providing the second mobile telephony service to the second group of subscribers.

18 Claims, 7 Drawing Sheets

(56) References Cited

U.S. PATENT DOCUMENTS

| | | |
|---|---|---|
| 6,873,858 B1 * | 3/2005 | Aguilar et al. ............ 455/552.1 |
| 6,987,751 B2 | 1/2006 | Jain et al. |
| 7,010,699 B1 | 3/2006 | Agarwal et al. |
| 7,751,389 B2 | 7/2010 | Kenyon et al. |
| 2002/0167906 A1 | 11/2002 | La Porta et al. |
| 2003/0112785 A1 * | 6/2003 | Jain et al. ..................... 370/342 |
| 2003/0139182 A1 | 7/2003 | Bakkeby et al. |
| 2003/0140169 A1 | 7/2003 | Einola et al. |
| 2004/0156354 A1 * | 8/2004 | Wang et al. .................. 370/352 |
| 2005/0078703 A1 | 4/2005 | Kim et al. |
| 2006/0111116 A1 | 5/2006 | Palmer et al. |

* cited by examiner

NETWORK ADAPTED TO MANAGE DIFFERENT MOBILE TELEPHONY SERVICES

TECHNICAL FIELD OF THE INVENTION

The present invention generally relates to the field of telecommunications, and more particularly to wireless, mobile communications networks, such as mobile telephony networks. In particular, the present invention relates to a mobile network being able to manage different mobile telephony services to be provided to subscribers of a mobile network.

BACKGROUND OF THE INVENTION

Mobile telephony networks have experienced an enormous spread, especially after the introduction of Second Generation (2G) mobile cellular networks, and particularly digital mobile cellular networks such as those complying with the Global System for Mobile communications (GSM) standard (and its United States and Japanese counterparts). The services offered by these cellular networks in addition to plain voice communications have rapidly increased in number and quality; just to cite a few examples, Short Messaging System (SMS), Multimedia Messaging System (MMS) services, and Internet connectivity services have been made available to subscribers of the cellular network in the last few years. It is expected that further services will be progressively made available to subscribers, especially with the advent of the Third Generation (3G) or Fourth Generation (4G) mobile networks.

A conventional GSM network 1, referred to as a public land mobile network (PLMN), is schematically illustrated in FIG. 1. A mobile switching center (MSC) 2 is connected via communication links to a number of base station controllers (BSCs) 4. The BSCs 4 are geographically dispersed across areas served by the mobile switching center 2. Each BSC controls one or more base transceiver stations (BTSs) 6 located remote from, and connected by further communication links to, its associated BSC. Each BTS 6 transmits radio signals to, and receives radio signals from, mobile stations 8 which are in an area served by that BTS. That area is generally referred to as a "cell". A GSM network is typically provided with a large number of such cells, which are ideally contiguous to provide continuous coverage over the whole network territory.

A mobile switching center 2 may be also connected via communications links to other mobile switching centers in the remainder of the mobile communications network 10, and to a public service telephone network (PSTN), which is not illustrated in FIG. 1. The mobile switching center 2 is associated with a home location register (HLR) 12, which is a database storing subscriber authentication data including the international mobile subscriber identity (IMSI) which is unique to each mobile station 8. The IMSI is also stored in the mobile station in a subscriber identity module (SIM) along with other subscriber-specific information.

The IMSI is a string of digits, including a mobile country code, typically indicating the home country of the mobile, a home public land mobile network (PLAN) code, indicating the home mobile network of the mobile station, an HLR code indicating the identity of the HLR in which the subscriber information is stored, and a subscriber identity number identifying the subscriber in the HLR.

The mobile switching center 2 is also associated with a visitor location register (VLR) 14, which is a database temporarily storing subscriber authentication data including the temporary mobile subscriber identity (TMSI) which uniquely identifies a mobile station in the VLR, for mobile stations which are active in the area served by the mobile switching center 2. Before subscriber authentication data is entered in a VLR, the subscriber is authenticated by accessing the subscriber's HLR.

Network sharing is a known technique that allows some physical components of a mobile network to be shared by different network operators. For example, White Paper titled "Shared Networks for WCDMA", by Ericsson (August 2003), available at the Internet address http://www.ericsson-.com/products/white_papers_pdf/251544_SharedNetw_W-P_Final.pdf discloses several solutions for infrastructure sharing among operators, especially for 3G business. Site Sharing typically involves sharing the site and mast for antenna placement. In addition to this, the power equipment, transmission equipment and antennas can be shared among operators. In the Shared UTRAN (UMTS Terrestrial Radio Access Network) the radio network is shared. One radio base station (RBS) is deployed per site, with individual frequencies for each operator. The radio network consists of RBS, Radio Network Controller (RNC) and transmission. The nodes are physically shared. The sharing operators deploy their individual core network. In the Common Shared Network solution the operators jointly build and operate one common 3G network, consisting of the radio network and part of the core network. The operators share the RBS, RNC, Mobile Services Switching CenterNisitor Location Register (MSCNLR) and Serving GPRS Support Node (SGSN). Each operator has its individual home network that contains the independent subscriber databases, services, subscriber billing and connection with external networks. The operators have individual Home Location Register (HLR), Gateway GPRS Support Node (GGSN), GMSC and service platforms.

The patent application WO 98/02008 discloses a public mobile communications network configured according to an established protocol (such as GSM) which includes a private network portion to which only a selected set of mobile stations have access. The network is modified by the provision of, one or more additional base transceiver stations and a set of private subscriber mobile stations which use a private PLMN code which is different to the public PLMN code of the main network. Each of the private subscriber mobile stations has the private PLMN code stored in its SIM as its home PLMN code. The private PLMN code forms part of its subscriber identity (IMSI) as prescribed by the GSM protocol. In addition, the SIM stores in a memory field a preferred PLMN list. The public PLMN code is given the status of most preferred alternative to the private PLMN code. The additional BTS, which functions compatibly with the main network BSCs, is controlled by its serving BSC to broadcast the private PLMN code, rather than the public PLMN code (which is broadcast by the public network portion BTSs), on its broadcast control channel (BCCH). The additional BTS may for example be located inside a building to provide in-building coverage. The MSC is modified to enable it to receive and respond to a service request originating from a private subscriber mobile station, transmitted via the additional BTS. The home location register is modified to store subscriber authentication data relating not only to the public subscriber mobile stations, but also to the private subscriber mobile stations. The additional network portion provided may be a network portion in which a modified set of services or call tariffs is available, possibly only to a select group of mobile stations using a network identity code which is different to that used by the remainder of the mobile stations.

SUMMARY OF THE INVENTION

According to the Applicant, the network modified according to the teachings of the above mentioned patent application no. WO 98/02008 has a drawback in that additional BTSs must be deployed in order to manage the service provided to the private subscribers. This may represent a problem in case the service for the private subscribers is provided in a widespread geographical area, in that lots of additional equipment should be added.

A problem tackled by the Applicant was to provide a mobile network being able to manage, with few constraints and limited intervention in the conventional mobile network infrastructure, different mobile telephony services (e.g. different sets of call tariffs, and/or of different sets of quality of service, and/or different sets of available network resources) for different groups of subscribers of the mobile network, even in widespread geographical areas (e.g., a whole Country). For example, an optimal mobile network could be configured so as to be able to provide a best effort service to low-paying subscribers, together with an average quality-of-service to medium-paying subscribers, together with a maximum quality-of-service to top subscribers.

The Applicant has found that such problem may be solved by providing an adapter node within the network. The adapter node communicates with the switching apparatuses and with the home location register of the network. In particular, the switching apparatuses and the home location register conventionally cooperate with each other in order to provide a first mobile telephony service. For provision of a second, different mobile telephony service, the adapter node coordinates the relevant activities thereof, by communicating (e.g. by signaling messages) with the remaining network apparatuses, in particular with the switching apparatuses and with the home location register.

According to a first aspect, the present invention relates to a mobile network adapted to provide a first mobile telephony service to a first group of subscribers and a second mobile telephony service to a second group of subscribers. The mobile network comprises a home location register and at least one switching equipment adapted to cooperate with the location register for providing the first mobile telephony service to the first group of subscribers. The mobile network further comprises at least one adapter node, adapted to cooperate with the home location register and with the at least one switching equipment for providing the second mobile telephony service to the second group of subscribers.

According to a second aspect, the invention relates to a method for registering the first group of subscribers for use of the first mobile telephony service, and the second group of subscribers for use of said second mobile telephony service in the mobile network. The method comprises:
- receiving at one switching equipment of the mobile network a first access request to the first mobile telephony service, comprising first authentication data, from a subscriber of the first group of subscribers;
- forwarding the first access request to the home location register of the mobile network;
- receiving at said switching equipment of the mobile network a second access request to the second mobile telephony service, comprising second authentication data, from a subscriber of the second group of subscribers;
- forwarding the second access request to the adapter node of the mobile network.

According to a third aspect, the invention relates to a method for requesting routing information for completing a call to a subscriber of the second group of subscribers, registered at one switching equipment of the mobile network for use of the second mobile telephony service. The method comprises:
- requesting a roaming number from the home location register to the adapter node;
- forwarding the roaming number request from the adapter node to the switching equipment;
- obtaining, at the adapter node, the roaming number from the switching equipment;
- forwarding the roaming number from the adapter node to the home location register.

According to a fourth aspect, the invention relates to a method for delivering a message to a subscriber of the second group of subscribers, registered at one switching equipment of the mobile network for use of the second mobile telephony service. The method comprises:
- delivering the message to the adapter node;
- forwarding the message from the adapter node to the switching equipment.

These and other features and advantages of the present invention will be made apparent by the following detailed description of preferred embodiments thereof, provided merely by way of non-limitative example, description that will be conducted with reference to the attached drawings.

DETAILED DESCRIPTION OF PREFERRED EMBODIMENTS OF THE INVENTION

Figure 1:
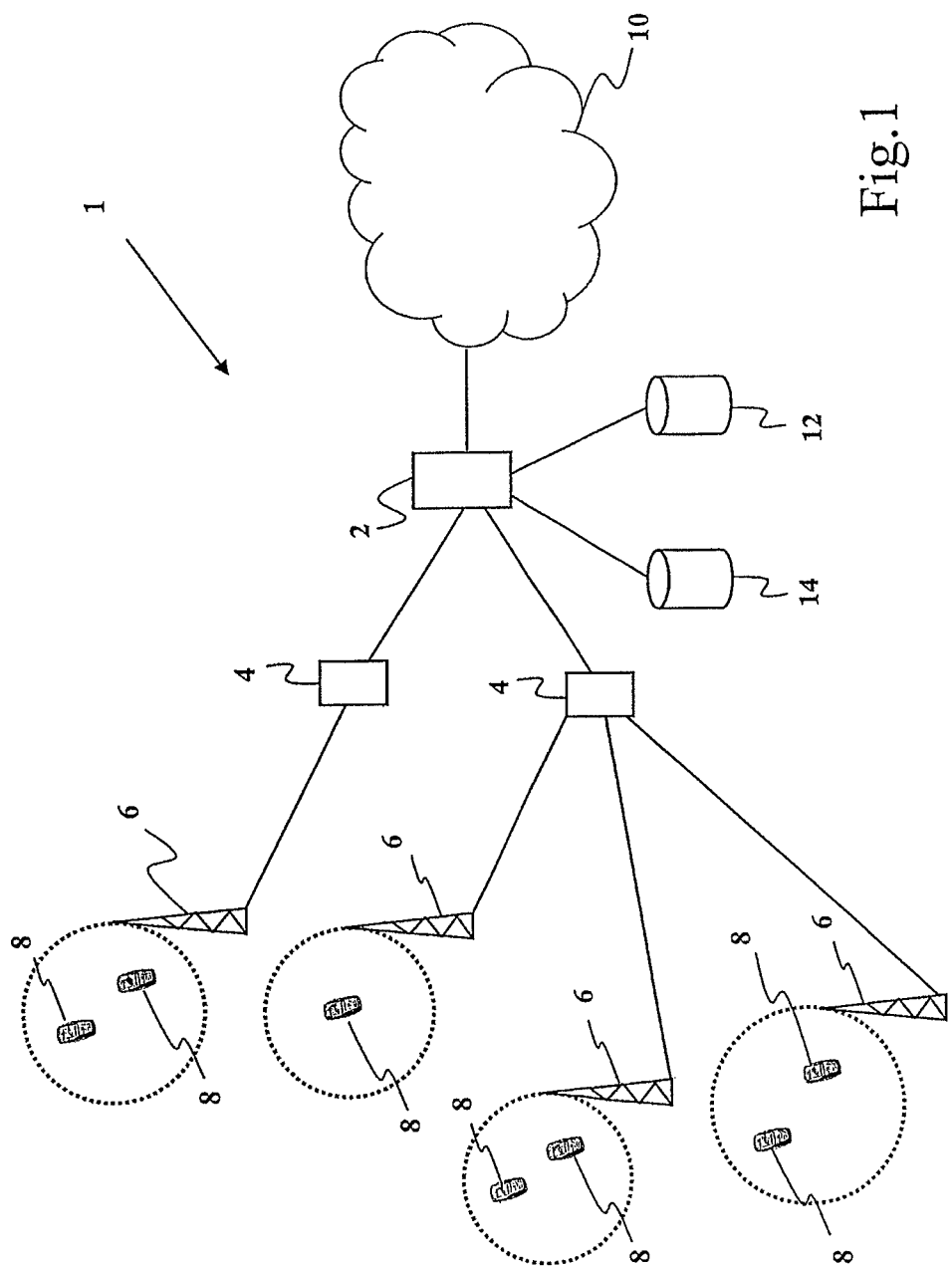
FIG. 1 schematically shows a portion of a conventional mobile network, already described.
Figure 2:
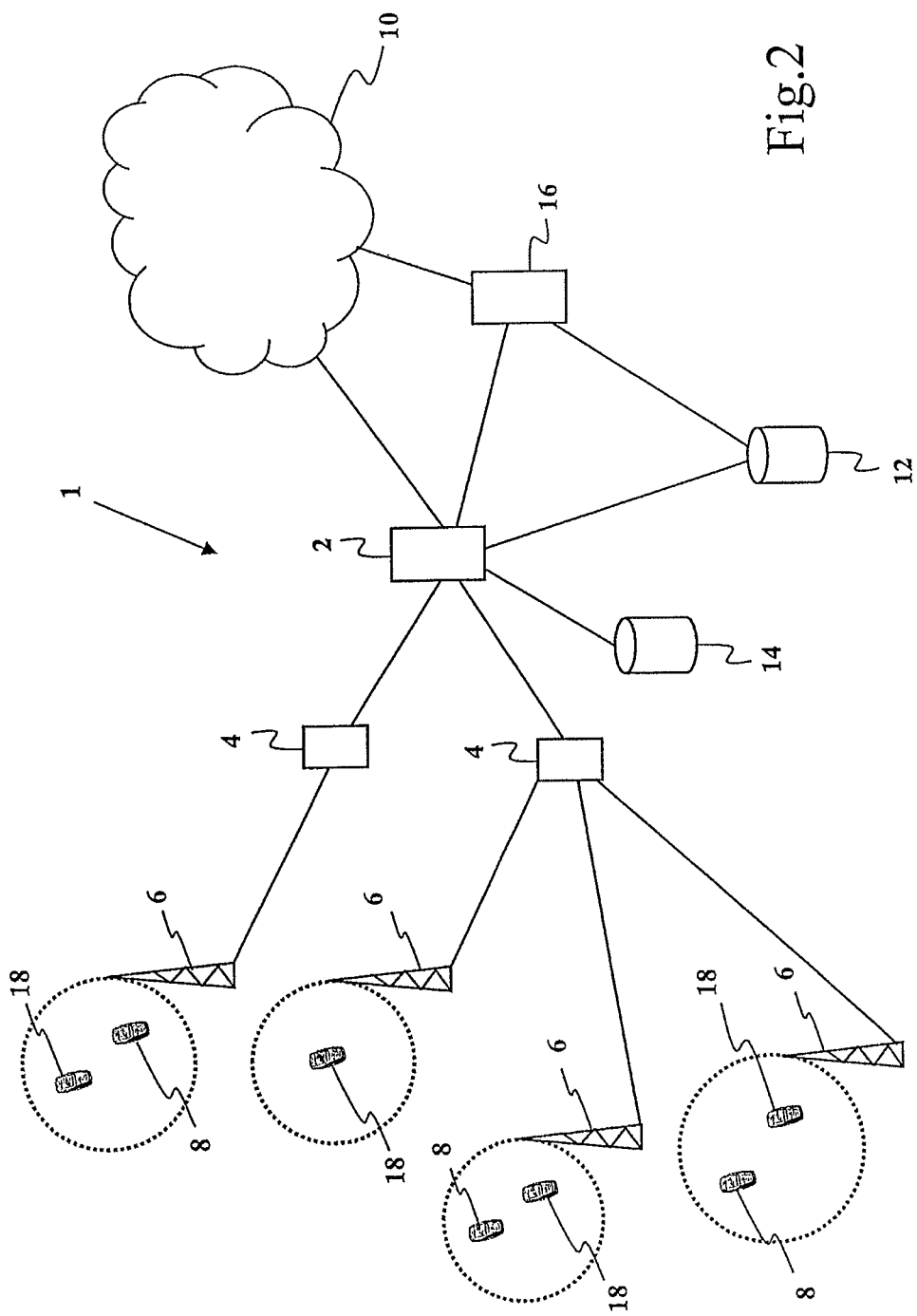
FIG. 2 schematically shows a portion of an exemplary mobile network according to the present invention.

FIG. 2 schematically shows a portion of an exemplary mobile network 1 according to the present invention. The mobile network is adapted to provide at least a first mobile telephony service to a first group of subscribers and a second, different mobile telephony service to a second group of subscribers of the mobile network operator.

For the purposes of the present invention, by "mobile telephony service" it is intended a service implemented in a mobile network, in which mobile telephonic equipment (e.g., mobile phones, personal digital assistants, smart cards for access to a mobile network to be associated with personal computers, etc.) is employed for the transmission of information. Such "information" may comprise, for example, voice, written text, images, multimedia information. The transmission of information may include circuit-based transmission and/or packet-based transmission.

The first and the second mobile telephony service may differ, in principle, in any feature, or any combination of features, of a mobile telephony service typically offered to mobile network subscribers, such as, for example: call duration; call tariff; call restrictions; quality of service; number, kind and tariff of available additional services (e.g., use of GPRS, WAP, SMS, MMS). In other words, the mobile network 1 allows the network operator to make different service offerings available to the subscribers, in the same manner as if it was a different mobile network operator. For a purely exemplary purpose, the following Table 1 shows two different profiles of mobile telephony services that can be made available to a first and to a second group of subscribers in the network of FIG. 2.

For example, Service Profile 1, available for the first group of subscribers, may correspond to a typical, average telephony service, whereas Service Profile 2, available for the second group of subscribers, may correspond to a low-cost telephony service, for which subscribers have less available services, as well as usability restrictions.

TABLE 1

|  | Service Profile 1 (First group of subscribers) | Service Profile 2 (Second group of subscribers) |
| --- | --- | --- |
| Duration of call to subscriber of the second group | Unlimited | 10 min. |
| Duration of call to subscriber of the first group/another operator/PSTN network | Unlimited | 2 min. |
| Duration of international call | Unlimited | No international call allowed |
| Duration of Internet service call | Unlimited | No Internet service allowed |
| Duration of call to Free Toll numbers | Unlimited | Unlimited |
| Duration of call to emergency services | Unlimited | Unlimited |
| Tariff | Cost/minute | Fixed cost/month |
| Fax service | Unlimited | Not allowed |
| International Roaming | Allowed | Not allowed |

It has to be understood that other different profiles may be provided: for example, a high-level telephony service may be provided for "top" subscribers, having a maximum quality of service and network resources availability (possibly emptying an availability of network resources for "lower class" subscribers). Preferred embodiments of the mobile network 1 of the invention allow maximum flexibility to the mobile network operator in the "packing" of various service features, in principle for providing any kind of telephony service to the different subscriber groups. As another example, telephony service for "closed groups" of subscribers (private service) may be provided in addition to a service open to all subscribers (public service).

Back to FIG. 2, the mobile network 1 comprises at least one switching equipment, typically a mobile switching center (MSC) 2. Other switching equipment comprised in the mobile network of FIG. 2 may be a SGSN (Serving GPRS Support Node), for providing packet-based transmission in the mobile network 1, for example using GPRS. In the remainder of the description, specific reference will be made only to a MSC: however, equal or similar considerations can be made or adapted for a generic switching equipment, such as for example a SGSN.

The MSC 2 is connected via communication links to a number of base station controllers (BSCs) 4. The BSCs 4 are geographically dispersed across areas served by the mobile switching center 2. Each BSC controls one or more base transceiver stations (BTSs) 6 located remote from, and connected by further communication links to, its associated BSC. Each BTS 6 transmits radio signals to, and receives radio signals from, a first group of mobile stations 8 which are in an area served by that BTS, belonging to the first group of subscribers of the mobile network operator. The area served by a BTS is generally referred to as a "cell". In addition, the BTSs 6 further transmit radio signals to, and receive radio signals from, at least a second group of mobile stations 18, belonging to the second group of subscribers of the mobile network operator. In preferred embodiments, the radio signals exchanged between the BTSs 6 and the mobile stations 8 of the first group of subscribers have a different frequency with respect to the radio signals exchanged between the BTSs 6 and the mobile stations 18 of the second group of subscribers. More preferably, a frequency used by the mobile stations 8 of the first group of subscribers lies in a different frequency band (e.g., in band around 900 MHz, typically ranging from about 880 MHz to about 960 MHz) with respect to a frequency used by the mobile stations 18 of the second group of subscribers (lying, e.g., in a band around 1800 MHz, typically ranging from about 1710 MHz to about 1880 MHz).

The MSC 2 may be also typically connected via communications links to other MSCs in the remainder of the mobile communications network 10, to other MSCs belonging to mobile networks of different mobile network operators, and to a public switched telephone network (PSTN), which are not illustrated in FIG. 2.

The MSC 2 is associated with a home location register (HLR) 12, which comprises a database, storing profile information of the subscribers of the mobile network. More particularly, the MSC 2 and the HLR 12 cooperate for providing the first and the second mobile telephony services to the mobile stations 8, 18. Typically, in a widespread mobile network, one HLR 12 is associated with a plurality of MSCs 2. In a preferred embodiment, the HLR 12 includes profile information of both the first and the second group of subscribers, so that it is not necessary to provide a HLR dedicated to the second mobile telephony service. The profile information comprises authentication data, needed for allowing authentication of the subscribers in the mobile network 1. The authentication data include the international mobile subscriber identity (IMSI) of the subscribers of the mobile network 1. The IMSI is also stored in the mobile stations 8, 18 of the subscribers, typically in a subscriber identity module (SIM), along with other subscriber-specific information. Other profile information stored in the HLR 12 may comprise services available to the subscribers, and related information for use of the same.

The mobile switching center 2 is typically also associated with a visitor location register (VLR) 14, which comprises a database temporarily storing subscriber authentication data, including a temporary mobile subscriber identity (TMSI) which uniquely identifies a mobile station in the VLR, for mobile stations which are active in the area served by the mobile switching center 2 (after authentication at the HLR).

At least one adapter node (AN) 16 is also comprised in the mobile network. The adapter node is associated to the MSC 2 and to the HLR 12. Furthermore, the AN 16 may also be connected via communications links to other MSCs in the remainder 10 of the mobile communications network, to other MSCs belonging to mobile networks of different mobile network operators, and to a public switched telephone network (PSTN), which are not illustrated in FIG. 2. For the purposes of the present invention, by "node" of a mobile network it is intended at least one hardware or software entity of the mobile network, being adapted to process information in order to provide, possibly in cooperation with other network entities, at least one network related function.

The AN 16 cooperates with the MSC 2 and the HLR 12 in order to provide one among the first and the second mobile telephony services to the subscribers of the mobile network 1. For simplicity, it will be assumed in the remainder of the description that the first mobile telephony service corresponds to a telephony service conventionally managed by the MSC 2 and by the HLR 12, without intervention of the AN 16, whereas the second mobile telephony service is managed by the MSC 2 and the HLR 12 with the aid of the AN 16.

In a preferred embodiment, the connections between the network apparatuses of the mobile network 1 (in particular the MSCs, such as the MSC 2) and the AN 16 are connections dedicated to signaling messages. In general, the apparatuses of the mobile network 1 may be configured so that the signaling messages related to traffic of the second mobile telephony service, as well as those related to authentication procedures for the second mobile telephony service, are sent to the AN 16. The AN 16, in turn, may be configured so as to send signaling messages to the apparatuses (in particular the MSCs, such as the MSC 2, and the HLR 12) of the mobile network 1, in order to set-up the needed connections for correctly routing traffic related to the second mobile telephony service (as well as for managing authentication for use of the second mobile telephony service). In such way, the AN 16 is responsible for "adapting" a conventional signaling, in order to establish, within the mobile network 1, possible special procedures needed for the management of the second mobile telephony service, with respect to the conventional first mobile telephony service. By setting up connections only dedicated to signaling between the network apparatuses of the mobile network 1 and the AN 16, a fast and efficient response may be guaranteed, so that delays in providing the second mobile telephony service may be strongly reduced, or even avoided.

In a preferred embodiment, the mobile stations 8 of the first group of subscribers (typically, the SIMs associated thereto) include a first IMSI series, and the mobile stations 18 of the second group of subscribers (typically, the SIMs associated thereto) include a second IMSI series, different from the first IMSI series. By "IMSI series" it is meant, in the framework of the present invention, a set of common fields in the IMSI values of all the subscribers of, respectively, the first and the second group of subscribers. The first and the second IMSI series may be associated, respectively, to the first and the second mobile telephony service. In particular, the first and the second IMSI series may differ in a field usually dedicated to the home network of the subscribers of the first and of the second group of subscribers. In other words, the first and the second telephony service may be treated, at the IMSI level, as the respective subscribers camped on different mobile networks. In more preferred embodiments, the mobile stations 8, 18 (typically, the SIMs associated thereto) of the subscribers of one of, or of both, the first and the second group of subscribers include IMSI values of both the first and the second IMSI series. A menu may be provided in the mobile stations 8, 18 (preferably, in the SIMs associated thereto), in order to present a choice to the subscribers, for use of an IMSI value of the first or of the second IMSI series, i.e., in order to use the first or the second mobile telephony service.

The IMSI values of the first IMSI series (or, more generally, of the IMSI series associated to the first mobile telephony service), are also included in the HLR 12, so that the mobile stations 8, 18 including the first IMSI series may authenticate themselves in the mobile network 1 using an IMSI of the first IMSI series, and take advantage of the first mobile telephony service. In a preferred embodiment, the AN 16 includes profile information related only to the second group of subscribers. This allows to limit a change in the information already stored in the HLR 12 for use of the first mobile telephony service. More particularly, the profile information included in the AN 16 may comprise authentication data for use of the second mobile telephony service, including IMSI values of the second IMSI series (or, more generally, of the IMSI series associated to the second mobile telephony service). Other profile information related the second group of subscribers, included in the AN 16, may specify available services of the second mobile telephony service, and related conditions of use. In the following, for sake of simplicity, the expression "IMSI value of the first (or second) IMSI series" will be referred as "first (or second) IMSI value".

In preferred embodiments, first and second IMSI values are associated with a same subscriber. In such case, the first and the second IMSI values may be associated with each other. In this embodiment, an association between the first and the second IMSI may be also included in the AN 16.

Figure 3:
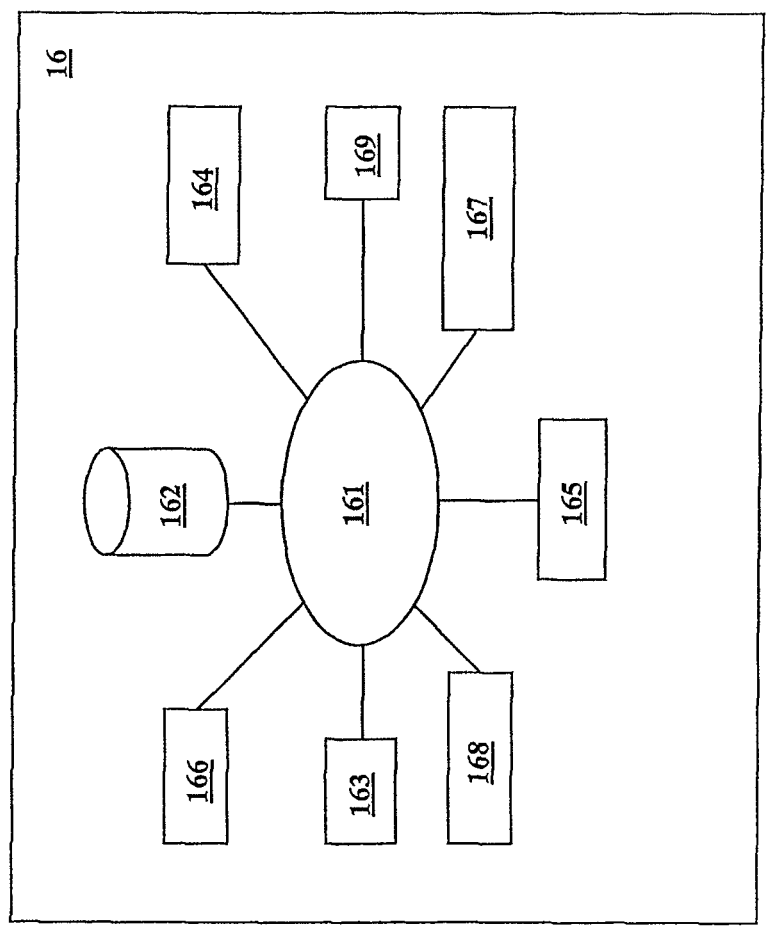
FIG. 3 schematically shows, in functional blocks, a preferred embodiment of an adapter node suitable for use in a mobile network according to the invention.

FIG. 3 schematically shows, in functional blocks sufficient for the purposes of the present invention, a preferred embodiment of an adapter node 16. The AN 16 comprises a number of sub-systems and/or interfaces dedicated to the communications to and from the other apparatuses of the mobile network 1. It is intended that the functions provided by the sub-systems and/or the interfaces comprised in the AN 16 may be realized by suitable software or hardware. A Node Manager Sub-System 161 may be provided for supervision of the different functions, to coordinate the activities of the various sub-systems and/or interfaces.

A HLR Sub-System 162 may be provided for managing a signaling (e.g. a MAP, Mobile Application Protocol, signaling) to and/or from the HLR 12 of the mobile network 1. The HLR Sub-System 162 may further store authentication data of the second group of subscribers, or, more generally, of the subscribers of the second mobile telephony service. Authentication data may comprise the second IMSI values associated with the second mobile telephony service. Authentication data may also comprise keys k, uniquely associated, for each subscriber of the second group of subscribers, to the second IMSI values. Authentication data may also comprise an association between the first IMSI value, associated with the first mobile telephony service, and the second IMSI value, associated with the second mobile telephony service, for each subscriber of both the first and the second mobile telephony services.

A VLR Sub-System 163 may be provided for managing a signaling (e.g. a MAP, Mobile Application Protocol, signaling) to and/or from a VLR 14 of the mobile network 1. A HLR/VLR Interface 165 may be provided for simulating, versus the other apparatuses of the mobile network 1 (in particular the MSCs), a behavior of a HLR or of a VLR, as it will be clarified in the following.

An Intelligent Network Interface 164 may be provided, if needed for the second mobile telephony service, for implementing functionalities typical of an intelligent network, such as, for example, call duration control. For example, the Intelligent Network Interface 164 may represent, versus the other apparatuses of the mobile network 1 (in particular the MSCs), a Service Capability Server (SCS) of an OSA (Open System Architecture) architecture.

A SMS-C/MMS-C Sub-System 166 may be provided for managing a SMS/MMS service for the subscribers of the second mobile telephony service, as it will be clarified in the following. A Mobile Number Portability Solver Sub-System 167 may be provided for coping with aspects related to the mobile number portability, i.e. in order to correctly signal the routing towards the right mobile network of information (e.g. phone calls, SMSs, MMSs) destined to a user not directly recognizable by its MSISDN. A Billing Sub-System 168 may be provided for the billing of the services used by the subscribers of the second mobile telephony service. An Equipment Identity Register Sub-System 169 may be provided for managing a signaling to and/or from an Equipment Identity Register of the mobile network 1 (not shown in FIG. 2), storing information related to blocked telephony equipment (e.g. stolen or lost mobile phones). Other sub-systems, not shown in FIG. 3, may be provided for managing signaling for other conventional apparatuses of a mobile network, such as for example core network apparatuses dedicated to a GPRS service (e.g., SGSN, GGSN).

In the following, a preferred procedure for authentication of the mobile stations 8, 18, in a preferred embodiment of a mobile network 1 according to the present invention, will be described. It will be assumed that:

the SIMs associated with the mobile stations 8, belonging to the first group of subscribers, comprise a first IMSI value (i.e. an IMSI of the first series), associated with the first mobile telephony service;

the SIMs associated with the mobile stations 18, belonging to the second group of subscribers, comprise both a first IMSI value (i.e. an IMSI of the first series), associated with the first mobile telephony service and a second IMSI value (i.e. an IMSI of the second series), associated with the second mobile telephony service;

both the first and the second IMSI values, for each subscriber of the second group of subscribers, are stored by the adapter node 16, in particular in a HRL Sub-System 162 of the latter;

an association between the first and the second IMSI value, for each subscriber of the second group of subscribers, is stored by the adapter node 16, in particular in the HLR Sub-System 162;

keys $k_i$ uniquely associated to the subscribers of the second group of subscribers, and to the respective second IMSI value, are also stored by the adapter node 16, in particular in the HLR Sub-System 162;

the first IMSI value (and the associated key $k_i$) of the subscribers of both the first and the second group of subscribers are stored by the HLR 12 of the mobile network 1.

With reference to FIG. 2, when a mobile station 8 of a subscriber of the first group of subscribers registers in the mobile network 1, the first IMSI value, stored in its SIM, is conventionally sent by the MSC 2 towards the HLR 12, for performing the authentication procedure. The key k, uniquely associated to the first IMSI value is retrieved by the HLR 12, for generation of authentication parameters to be sent back to the mobile station 8, as known in the art. If the authentication procedure is successful, the mobile station 8 may enjoy the first mobile telephony service.

When a mobile station 18 of a subscriber of the second group of subscribers registers in the mobile network 1, a choice between the first IMSI value and the second IMSI value may be presented on the display of the mobile station 18. If the subscriber chooses the first IMSI value, the authentication procedure follows the conventional course above described with reference to the registration procedure of a mobile station 8 of a subscriber of the first group of subscribers. In such way the subscriber of the second group of subscribers may enjoy the first mobile telephony service.

Figure 4:
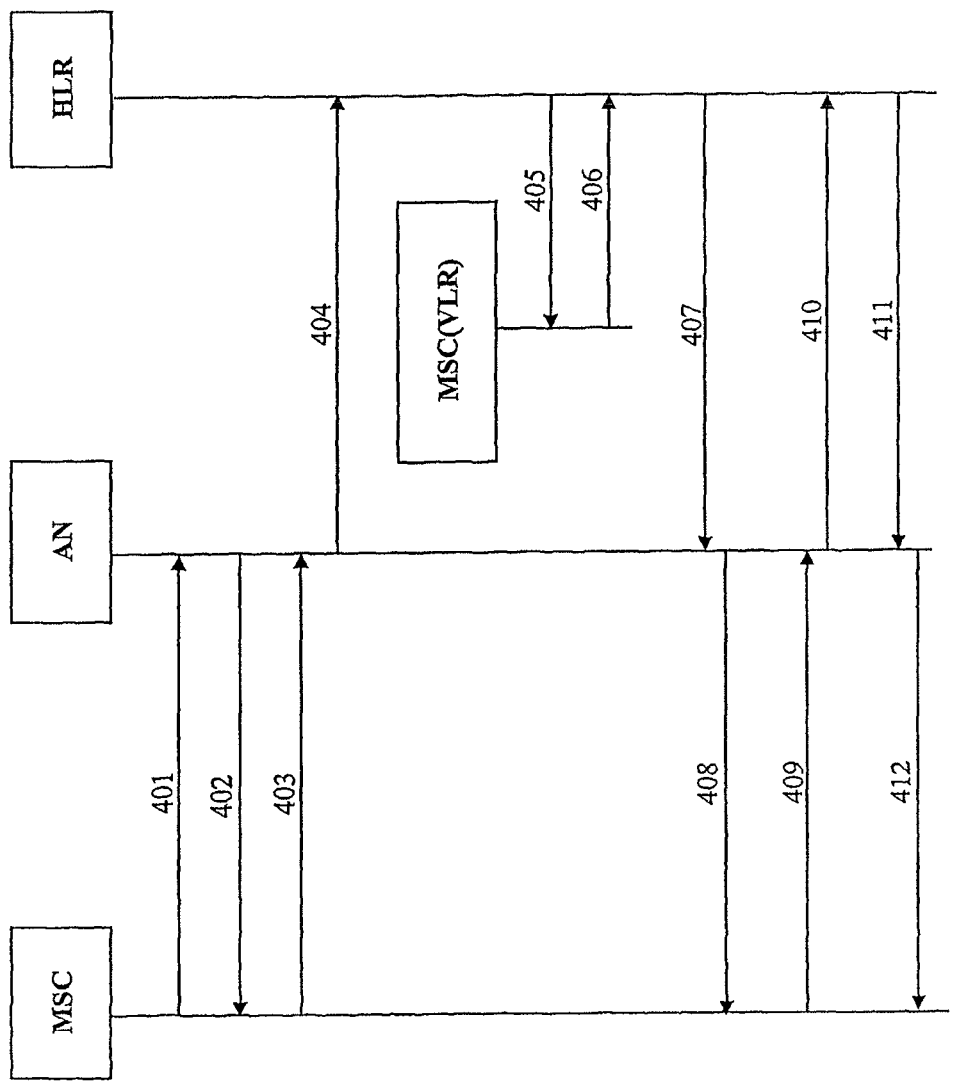
FIG. 4 schematically shows a signaling procedure between various apparatuses of the mobile network of FIG. 2 for authentication/registration of a mobile station, involving use of an adapter node.

With reference to FIGS. 2 and 4, if the subscriber chooses the second IMSI value, in other words if the subscriber chooses to enjoy the second mobile telephony service, a different procedure, involving the adapter node 16, is performed. Initially, the second IMSI value is sent to the MSC 2. The MSC 2 recognizes that the received IMSI value belongs to the second IMSI series (associated with the second mobile telephony service), and sends the received IMSI value to the adapter node 16 (step 401 in FIG. 4), e.g. with a MAP Send_Authentication_Info signaling message, for requesting thereat the authentication parameters. In other words, the MSC 2 is configured to "see" the adapter node 16 as a HLR for the second mobile telephony service.

The adapter node 16, retrieves from its database the key $k_i$ uniquely associated to the received second IMSI value, and calculates the authentication (and encryption) parameters valid for the session. Such parameters (typically $k_o$, SRES, Rand) are then sent back (step 402 in FIG. 4) to the MSC 2 (e.g. with a MAP Send_Authentication_Info_ACK signaling message), that forwards them to the mobile station 18.

When the mobile station 18 signals that the mutual authentication has been verified, the MSC 2 may send an Update_Location signaling message to the adapter node 16 (step 403 in FIG. 4), always seen by the MSC 2 as a HLR for the second mobile telephony service, in order to allow localization of the mobile station 18 requesting the second mobile telephony service. The adapter node 16 retrieves by its database the first IMSI value associated to the second IMSI value received in the Update_Location message, and forwards an Update_Location signaling message to the HLR 12 by including the first IMSI value (step 404 in FIG. 4). In this way, the HLR 12 "sees" the adapter node 16 as a MSCNLR that signals a possible change of location of a mobile station corresponding to the first IMSI value.

If the mobile station 18 was previously registered in the mobile network 1, for use of the first telephony service, under a certain MSCNLR (or if the mobile station 18 was previously registered for use of the second mobile telephony service under a different adapter node), for example the VLR 14 associated with the MSC 2, a Cancel_Location signaling message may be sent by the HLR 12 to the VLR 14 (step 405 in FIG. 4), in order to allow the VLR 14 to cancel from its records the entry corresponding to the first IMSI value previously stored. The VLR 14 may acknowledge the HLR 12 (e.g. with a Cancel_Location_ACK, step 406 in FIG. 4) of the canceling of the record entry.

The HLR 12 may then send (step 407 in FIG. 4) to the adapter node 16 (seen as a MSC) a profile stored for the subscriber corresponding to the first IMSI value, e.g. with an Insert_Subscriber_Data signaling message. Profile information stored at the HLR 12 may include entries related to the second mobile telephony service (possibly together with entries related o the first mobile telephony service), for example a bar for the use of the network. The adapter node 16 processes the received profile information, by e.g. filtering, from the received message, profile information unrelated to the second mobile telephony service. In turn, it may add profile information, stored thereat, related to the second mobile telephony service, and send this new profile information (step 408 in FIG. 4) to the MSC 2. The MSC 2 registers the profile information related to the use of the second mobile telephony service and acknowledges (step 409 in FIG. 4) the adapter node 16 of the occurred profile registration (e.g. with an Insert_Subscriber_Data_ACK signaling message). The acknowledge message may be then forwarded (step 410 in FIG. 4) by the adapter node 16 to the HLR 12.

The authentication/registration procedure may then end with an acknowledge message (e.g. an Update_Location_ACK signaling message) from the HLR 12 to the adapter node 16 (step 411 in FIG. 4), acknowledge message that can be forwarded by the latter to the MSC 2 (step 412 in FIG. 4). At the end of the authentication/registration procedure, the HLR 12 stores information related to the AN 16 as the VLR under which the mobile station 18 requesting the second mobile telephony service is registered. In turn, the AN 16 correctly stores information related to the VLR 14 as the actual VLR under which the mobile station 18 is registered.

The above preferred procedure has been explained with reference to a mobile network such as the one shown in FIG. 2, in which two separate connections exist, respectively between the MSC 2 and the HLR 12 and between the MSC 2 and the AN 16. In this network embodiment, the MSC 2 is instructed for contacting the AN 16 when it recognizes messages including the second IMSI values. In an alternative configuration, the AN 16 may be interposed in a connection between the MSC 2 and the HLR 12, so as to intercept the signaling messages exchanged between the two apparatuses and to adapt them for the purposes of providing access to the second mobile telephony service.

In all cases, the MSCs, such as the MSC 2, do not behave in different way when receiving a message from the AN 16 or from the HLR 12. Equivalently, the HLR 12 does not behave in different way when receiving a message from the AN 16 or from the MSC 2 (or from the VLR 14 associated thereto). In other words, no "special" configuration of the main network apparatuses is needed in the mobile network of the invention in order to provide the first and the second mobile telephony service. In particular, all the messages exchanged between the MSCs and the HLR in order to provide access to the second mobile telephony service may be managed and adapted by the AN 16. In particular, in the preferred embodiment explained above both the subscribers of both the first and the second mobile telephony service are "seen" by the HLR 12 simply as "subscribers" of the mobile network 1, all having the same general profile, mainly related the first mobile telephony service. The AN 16 is then responsible for managing the differences in the service profile corresponding to the second mobile telephony service. Advantageously, this allows to maintain the same database profile structure, or in all cases to keep the modifications thereof to a slight extent, in the HLR 12 of the mobile network 1, notwithstanding having a great flexibility in the variability of the offerings to the subscribers of the first and of the second mobile telephony service.

In the following, a preferred procedure will be described for the routing of a call originated by a mobile station 18 registered for use of the second mobile telephony service, in the preferred embodiment of mobile network explained above with reference to the authentication/registration procedure. The steps of the preferred procedure are shown in FIG. 5.

Figure 5:
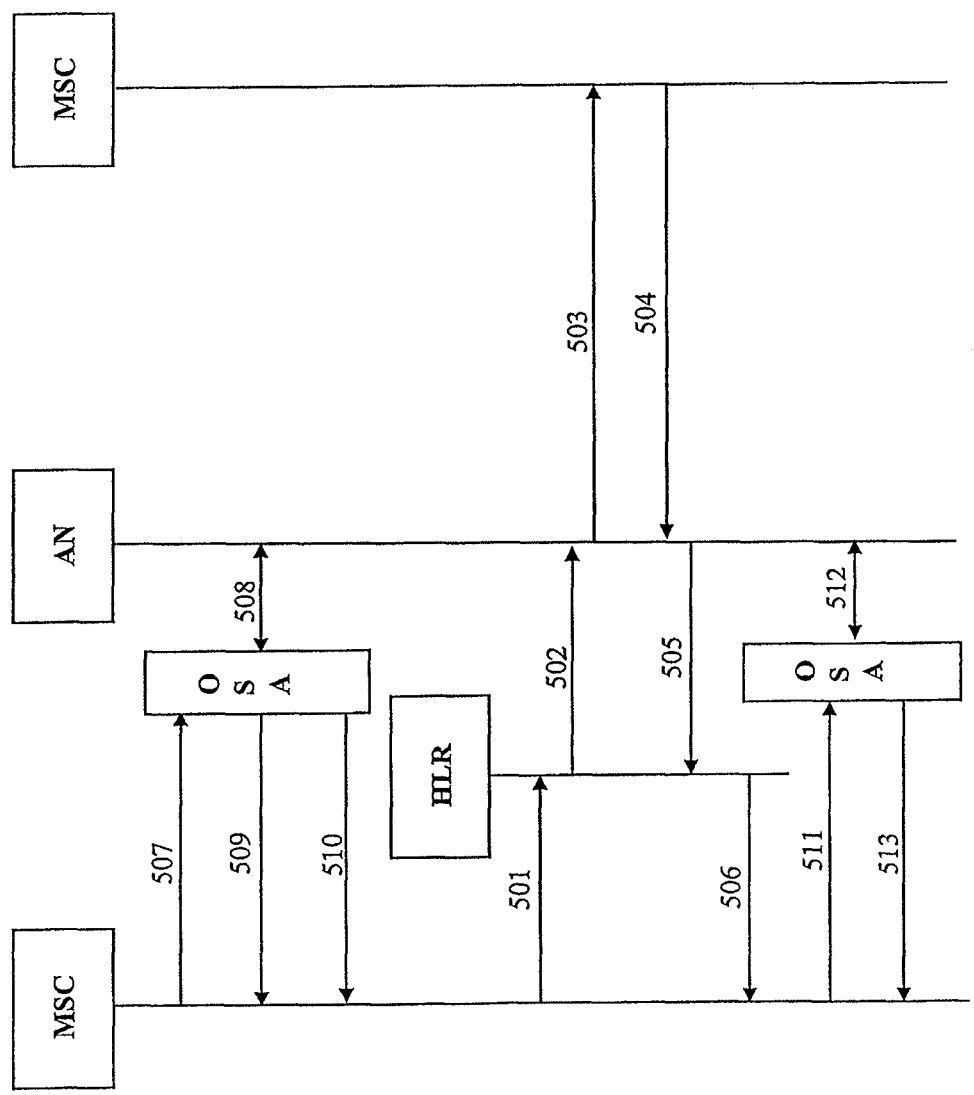
FIG. 5 schematically shows a signaling procedure between various apparatuses of the mobile network of FIG. 2 for the routing of a call from a mobile station, involving use of an adapter node.

With reference to FIGS. 2 and 5, when a mobile station 18 of a subscriber of the second group of subscribers places a call, the MSC 2 requires (step 501 in FIG. 5) routing information for completing the call to the HLR of the called subscriber, e.g. by a MAP Send_Routing_Info signaling message. If the called subscriber is a subscriber of the mobile network 1, the routing information is requested to the HLR 12. If the called subscriber is registered in the mobile network 1 by means of the first IMSI value (i.e. if the called subscriber is registered for use of the first mobile telephony service), the HLR 12 has stored the information of the VLR under which the called subscriber is registered, so that a roaming number request is conventionally sent to the MSC corresponding to that VLR (e.g. by a MAP Provide_Routing_Number signaling message). On the other hand, if the called subscriber is registered in the mobile network 1 by means of the second IMSI value (i.e. if the called subscriber is registered for use of the second mobile telephony service), the HLR 12 has stored the AN 16 as VLR under which the called subscriber is registered, so that the roaming number request is sent by the HLR 12 to the AN 16 (step 502 in FIG. 5).

The AN 16 has stored the VLR under which the called subscriber, registered for the second mobile telephony service, is actually registered, so that the roaming number request is forwarded by the AN 16 to the MSC corresponding to the VLR (step 503 in FIG. 5). Before forwarding the roaming number request, the AN 16 may verify that all the requirements of the second mobile telephony service are satisfied in the profile of the calling subscriber, in other words it verifies if there is bar to the call completion for the calling subscriber. In the negative, the roaming number request is not forwarded to the MSC of the called subscriber: in such case, an error message informing that a roaming number is not available may be returned to the HLR 12 (not shown in FIG. 5).

Once the roaming number has been obtained by the MSC of the called subscriber (step 504 in FIG. 5), the AN 16 sends the same to the HLR 12 (step 505 in FIG. 5), e.g. by a MAP Provide_Roaming_Number_ACK signaling message. The roaming number is then sent by the HLR 12 to the MSC of the calling subscriber, i.e. the MSC 2 (step 506 in FIG. 5), e.g. by a MAP Send_Routing_Info_ACK signaling message. The call between the MSC 2 of the calling subscriber and the MSC of the called subscriber, and then between the calling subscriber and the called subscriber, can thus be established.

In case the second mobile telephony service requires call control by means of intelligent network functionality (for example because the call should have a maximum duration, see table 1), such intelligent network functionality is preferably implemented in the AN 16, as explained before with reference to FIG. 3. For example, an OSA SCS may be implemented in the AN 16. In such case, the MSC 2 is instructed to trigger the OSA SCS when the call is requested by the calling subscriber (step 507 in FIG. 5). The OSA SCS sends the call control method to be applied to the sub-system(s) of the AN 16 appointed for such method, in order to allow the AN 16 to verify if the call is allowed, and/or it has to be monitored by the OSA SCS. Once the verification has been performed, the AN 16 instructs the OSA SCS (step 508 in FIG. 5), according to the result. If the call is allowed, the instruction is sent by the AN 16 to the OSA SCS, and then by the OSA SCS to the MSC 2 (step 509 in FIG. 5), for allowing the latter to begin the call routing procedure. An instruction for reporting of events occurring during the call may be further sent by the OSA SCS to the MSC 2 (step 510 in FIG. 5).

Event reporting may be provided, during the call, by the MSC 2 to the OSA SCS (step 511 in FIG. 5). A continuous dialogue may be established, during the call, between the OSA SCS and the other sub-systems of the AN 16 (step 512 in FIG. 5), in order to check if an intervention should be made on the established call. For example, an instruction of releasing the call may be sent by the OSA SCS to the MSC 2 (step 513 in FIG. 5), if a releasing condition provided by the rules of the second mobile telephony service is met (e.g., if a maximum duration of the call is reached).

In the following, a preferred procedure will be described for the routing of a Short Message (SMS) originated by a mobile station 18 registered for use of to the second mobile telephony service, in the preferred embodiment of mobile network explained above with reference to the authentication/registration procedure. The steps of the preferred procedure are shown in FIG. 6.

Figure 6:
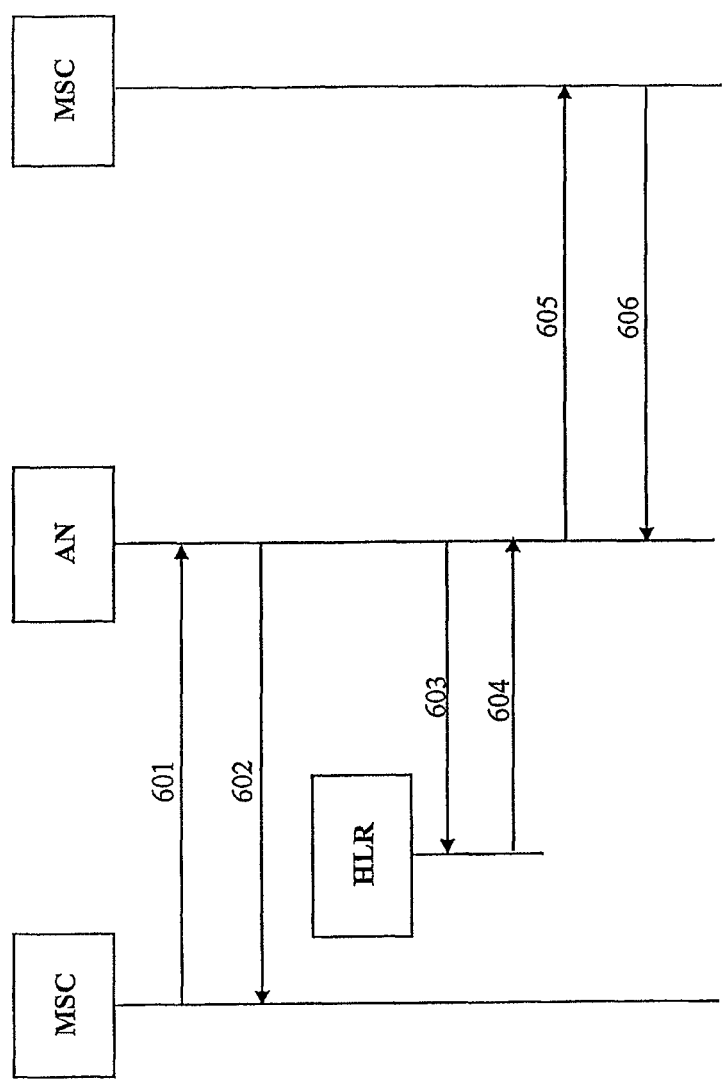
FIG. 6 schematically shows a signaling procedure between various apparatuses of the mobile network of FIG. 2 for the routing of a short message, involving use of an adapter node.

With reference to FIGS. 2 and 6, the mobile stations 18 (or the SIMs associated thereto) of the subscribers of the second group of subscribers may be preferably configured so as to have the address (typically corresponding to a phone number) of the AN 16 as SMS Center (SMS-C) associated to the second IMSI value (i.e. the IMSI associated with the second mobile telephony service). After having prepared the SMS, the subscriber sends the same. The SMS reaches the MSC 2, that forwards the same to the AN 16 (step 601 in FIG. 6), e.g. by a MO_Forward_SM signaling message. The AN 16 may send back an acknowledgement to the MSC 2 (step 602 in. FIG. 6), e.g. by a MO_Forward_SM_ACK signaling message. The AN 16, possibly after verifying that the sending of the SMS is enabled in the second mobile telephony service, and/or is available for the sending subscriber, requests to the HLR 12 the routing for delivering the SMS, i.e. the address of the MSCNLR under which the recipient mobile station is registered, e.g. by a Send_Routing_Info_for_SM signaling message (step 603 in FIG. 6). After having received such address (step 604 in FIG. 6), e.g. by a Send_Routing_Info_for_SM_ACK signaling message, the AN 16 delivers the SMS to the MSC corresponding to the VLR under which the recipient mobile station is registered (step 605 in FIG. 6), e.g. by a MT_Forward_SM signaling message. An acknowledgement may be sent back by the MSC to the AN 16 (step 606 in FIG. 6).

It is noticed that in the above preferred procedure the AN 16 acts as a SMS-C in the mobile network 1 for subscribers of the second mobile telephony service, as well as for the other apparatuses of the mobile network 1. In particular, both the MSC 2 and the HLR 12 do not distinguish the AN 16 from any conventional SMS-C.

In the following, a preferred procedure will be described for the delivery of a Short Message (SMS) addressed to a mobile station 18 registered for use of to the second mobile telephony service, in the preferred embodiment of mobile network explained above with reference to the authentication/registration procedure. The steps of the preferred procedure are shown in FIG. 7.

Figure 7:
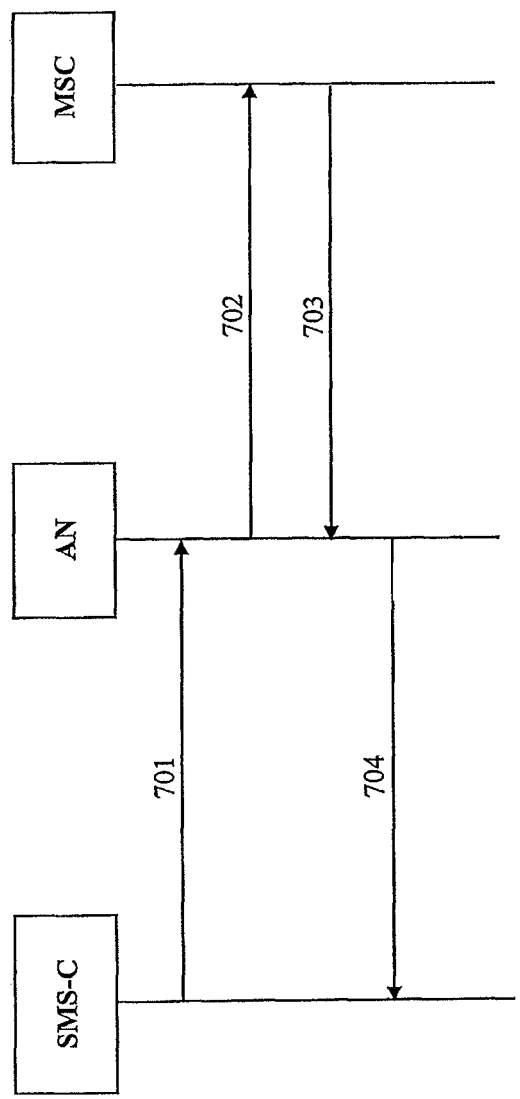
FIG. 7 schematically shows a signaling procedure between various apparatuses of the mobile network of FIG. 2 for the delivery of a short message, involving use of an adapter node.

With reference to FIGS. 2 and 7, when a SMS has to be delivered to a mobile station 18 registered for the second mobile telephony service, the SMS-C of the sender obtains the address of the AN 16 as MSCNLR to which the SMS has to be delivered, since such information is stored in the HLR for the subscribers registered for the second mobile telephony service, as explained above with reference to the authentication/registration procedure for the second mobile telephony service. Thus, the SMS is delivered to the AN 16 (step 701 in FIG. 7), e.g. by means of a MT_Forward_SM signaling message. The AN 16 can then forward the SMS to the MSC 2 (step 702 in FIG. 7), i.e. the MSC corresponding to the actual VLR under which the recipient mobile station 18 is registered, that delivers the SMS to the mobile station 18. An acknowledgement may be sent back by the MSC 2 to the AN 16 (step 703 in FIG. 7), acknowledgement that can be forwarded back to the MSC of the sender by the AN 16 (step 704 in FIG. 7).

Many advantages are provided by the mobile network according to the invention, including an access node configured as explained above. The provision of the adapter node allows a full "segmentation" of the mobile network, so that completely different sets of offerings may be prepared by the mobile network operator for its subscribers. In preferred embodiments, a respective adapter node may be provided in the mobile network for each additional mobile telephony service. However, a single access node may be configured so as to manage more than one additional mobile telephony service.

In particular, telephony services having different quality of service may be implemented in the mobile network. A mobile network operator may take advantage of such feature, in order to fully exploit its existing network, in particular its existing radio access portion, i.e. the portion of the mobile network from the BSCs to the mobile stations. More particularly, the availability of the network resources may be shared by the subscribers of the different mobile telephony services with priority rules, according to which users registered for a telephony service having a lower quality may use the network resources unless such network resources have to be fully used by subscribers registered for a higher quality service. This can be done in the mobile network according to the invention, without the necessity of providing dedicated resources (and the associated risk of having such dedicated resources unused) for the subscribers of the higher quality mobile telephony service.

Although the adapter node has been described as a separate entity within the mobile network, this has not to be intended as limiting the present invention, since a functionality of adapter node according to what disclosed above may be implemented by suitable software stored on a network apparatus already adapted for providing conventional functionalities, such as for example the apparatus comprising the HLR.

The invention claimed is:

1. A mobile network adapted to provide a first mobile telephony service to a first group of subscribers and a second mobile telephony service to a second group of subscribers, comprising:
   a home location register;
   at least one switching equipment adapted to cooperate with said home location register for providing said first mobile telephony service to said first group of subscribers; and
   at least one adapter node adapted to contemporaneously cooperate with said home location register and with said at least one switching equipment for providing said second mobile telephony service to said second group of subscribers, wherein said first mobile telephony service is associated with a first mobile subscriber identity series and said second mobile telephony service is associated with a second mobile subscriber identity series different from the first mobile subscriber identity series, said second group of subscribers having subscriber identity modules each being associated with both a mobile subscriber identity of the first series and a mobile subscriber identity of the second series.

2. The mobile network of claim 1, wherein said home location register comprises first profile information related to both said first and said second group of subscribers.

3. The mobile network of claim 1, wherein said adapted node comprises second profile information related to only said second group of subscribers.

4. The mobile network of claim 3, wherein said second profile information comprises authentication data for using said second mobile telephony service.

5. The mobile network of claim 4, wherein said adapter node is adapted to calculate authentication parameters, for access to the mobile network, from said authentication data.

6. The mobile network of claim 1, wherein said first mobile telephony service is provided using a first radio frequency and said second mobile telephony service is provided using a second radio frequency different from said first radio frequency.

7. The mobile network of claim 6, wherein said first a radio frequency lies within a band around 900 MHz.

8. The mobile network of claim 6, wherein said second radio frequency lies within a frequency band around 1800 MHz.

9. The mobile network of claim 1, wherein said home location register and said at least one switching equipment are connected to said adapter node by connections adapted for transmission of signaling messages.

10. The mobile network of claim 9, wherein said adapter node is adapted to intercept signaling messages exchanged between said switching equipment and said home location register.

11. The mobile network of claim 1, wherein said adapter node is adapted to act as a home location register versus said at least one switching equipment for said second mobile telephony service.

12. The mobile network of claim 1, wherein said adapter node is adapted to act as a switching equipment versus said home location register for said second mobile telephony service.

13. The mobile network of claim 1, wherein said adapter node is adapted to act as a short message service center versus said at least one switching equipment for said second mobile telephony service.

14. The mobile network of claim 1, wherein said adapter node is adapted to act as a visitor location register versus said home location register for said second mobile telephony service.

15. The mobile network of claim 1, wherein said adapter node is adapted to store an association between a mobile subscriber identity of said first mobile subscriber identity series and a mobile subscriber identity of said second mobile subscriber identity series.

16. A mobile network adapted to provide a first mobile telephony service to a first group of subscribers and a second mobile telephony service to a second group of subscribers, the mobile network comprising:
a home location register;
at least one switching equipment adapted to cooperate with said home location register for providing said first mobile telephony service to said first group of subscribers; and
at least one adapter node adapted to:
act as a visitor location register versus said home location register for said second mobile telephony service, and
cooperate with said home location register and with said at least one switching equipment for providing said second mobile telephony service to said second group of subscribers.

17. A mobile network adapted to provide a first mobile telephony service to a first group of subscribers and a second mobile telephony service to a second group of subscribers, wherein said first mobile telephony service is associated with a first mobile subscriber identity series and said second mobile telephony service is associated with a second mobile subscriber identity series different from the first mobile subscriber identity series, comprising:
a home location register;
at least one switching equipment adapted to cooperate with said home location register for providing said first mobile telephony service to said first group of subscribers; and
at least one adapter node adapted to cooperate with said home location register and with said at least one switching equipment for providing said second mobile telephony service to said second group of subscribers, and store an association between a mobile subscriber identity of said first mobile subscriber identity series and a mobile subscriber identity of said second mobile subscriber identity series.

18. A mobile network adapted to provide a first mobile telephony service to a first group of subscribers and a second mobile telephony service to a second group of subscribers, comprising:
a home location register;
at least one switching equipment adapted to cooperate with said home location register for providing said first mobile telephony service to said first group of subscribers; and
at least one adapter node connected to said home location register and said at least one switching equipment by connections adapted for transmission of signaling messages, said at least one adapter node being adapted to cooperate with said home location register and with said at least one switching equipment for providing said second mobile telephony service to said second group of subscribers and to intercept signaling messages exchanged between said switching equipment and said home location register.

* * * * *